United States Patent
Zhang et al.

(10) Patent No.: US 10,469,763 B2
(45) Date of Patent: Nov. 5, 2019

(54) VISUAL PRIVACY PROTECTION SYSTEM

(71) Applicant: Wisconsin Alumni Research Foundation, Madison, WI (US)

(72) Inventors: Xinyu Zhang, Madison, WI (US); Chi Zhang, Madison, WI (US); Shilin Zhu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 22 days.

(21) Appl. No.: 15/616,386

(22) Filed: Jun. 7, 2017

(65) Prior Publication Data

US 2018/0359403 A1    Dec. 13, 2018

(51) Int. Cl.
H04N 5/235 (2006.01)
H04N 5/225 (2006.01)
H04N 5/232 (2006.01)
H05B 37/02 (2006.01)

(52) U.S. Cl.
CPC ......... H04N 5/2354 (2013.01); H04N 5/2256 (2013.01); H04N 5/2351 (2013.01); H04N 5/23203 (2013.01); H05B 37/0227 (2013.01); H05B 37/0272 (2013.01); H04N 5/2353 (2013.01)

(58) Field of Classification Search
None
See application file for complete search history.

(56) References Cited

U.S. PATENT DOCUMENTS

| | | |
|---|---|---|
| 6,529,600 B1 | 3/2003 | Epstein et al. |
| 6,559,883 B1 | 5/2003 | Fancher et al. |
| 6,771,349 B2 | 8/2004 | Sitrick et al. |
| 7,006,630 B2 | 2/2006 | Yu et al. |
| 7,103,074 B2 | 9/2006 | Karakawa |
| 7,170,577 B2 | 1/2007 | Sitrick et al. |
| 7,324,646 B1 | 1/2008 | Burstyn et al. |
| 7,634,089 B1 | 12/2009 | Burstyn |
| 7,634,134 B1 | 12/2009 | So |
| 8,006,311 B2 | 8/2011 | Sitrick et al. |

(Continued)

FOREIGN PATENT DOCUMENTS

| | | |
|---|---|---|
| JP | 2013110967 A | 4/2003 |
| JP | 2008079289 A | 4/2008 |

(Continued)

OTHER PUBLICATIONS

International Search Report; Application No. PCT/US2017/030960; dated Jul. 21, 2017.
U.S. Appl. No. 15/164,195, filed May 25, 2016.

*Primary Examiner* — Mark T Monk (74) *Attorney, Agent, or Firm* — Boyle Fredrickson S.C.

(57) ABSTRACT

A visual privacy system unilaterally blocks rolling shutter cameras by providing a periodically interrupted ambient light source imposing bright and dark bands on the image yet at a frequency imperceptible to human observers in the environment. Communication of the modulation pattern to authorized cameras allows unaffected imaging in these regions by authorized individuals. The system also contemplates operation in a barcoding mode with a light modulation providing embedded barcodes that can be extracted from images taken in the region to indicate that the images were improperly acquired and to block the images in certain applications.

10 Claims, 5 Drawing Sheets

(56) References Cited

U.S. PATENT DOCUMENTS

| | | | |
|---|---|---|---|
| 8,018,569 | B2 | 9/2011 | Goodhill et al. |
| 8,559,791 | B2 | 10/2013 | Tchoukaleysky |
| 2006/0033017 | A1 | 2/2006 | Light et al. |
| 2009/0268942 | A1 | 10/2009 | Price |
| 2010/0323608 | A1 | 12/2010 | Sanhedral et al. |
| 2011/0128384 | A1 | 6/2011 | Tiscareno et al. |
| 2011/0279739 | A1* | 11/2011 | Nairn ............... G03B 21/56 348/759 |
| 2013/0331037 | A1 | 12/2013 | Kusakari |
| 2014/0235269 | A1 | 8/2014 | Ericsson et al. |
| 2015/0327340 | A1* | 11/2015 | Siessegger ........ H05B 33/0818 315/200 R |
| 2016/0054440 | A1 | 2/2016 | Younis |
| 2016/0139234 | A1* | 5/2016 | Ganick ............... G01S 1/70 398/127 |
| 2016/0315702 | A1* | 10/2016 | Roberts ............ H04B 10/5563 |
| 2017/0038041 | A1* | 2/2017 | Ng ..................... F21S 8/026 |
| 2017/0076015 | A1* | 3/2017 | Patel ................ G06F 17/5004 |

FOREIGN PATENT DOCUMENTS

| | | | |
|---|---|---|---|
| WO | 2014083473 | A1 | 6/2014 |
| WO | 2015077767 | A1 | 5/2015 |

* cited by examiner

VISUAL PRIVACY PROTECTION SYSTEM

STATEMENT REGARDING FEDERALLY SPONSORED RESEARCH OR DEVELOPMENT

This invention was made with government support under 1506657 awarded by the National Science Foundation. The government has certain rights in the invention.

CROSS REFERENCE TO RELATED APPLICATION

BACKGROUND OF THE INVENTION

The present invention relates to a system for controlling the use of cameras to record visual images in given locations and in particular to a privacy protection system that may work with standard rolling shutter cameras.

Electronic cameras are pervasive, being found on common consumer devices including smart phones, tablets, drones, smart glasses, and the like. The ubiquity of these cameras, paired with widely available wireless access, raises significant visual privacy issues including individual privacy, for example, in locker rooms and the like, the prevention of copying of visual works such as art or the like, and the protection of other visual information such as trade secrets.

A variety of privacy enhancing systems have been proposed that require the cameras to sense and abide by signals indicating that the camera is in a "no photography zone" or is focused on a subject that should not be photographed. The signals may be visual, for example, a QRS code. Currently very few, if any, cameras respect such signals, and accordingly these "bilateral" visual privacy systems, requiring coordination between the holder of privacy rights and the camera owner, are limited in use.

A desire to enforce visual privacy against a wide variety at cameras without special modification to those cameras ("unilateral" visual privacy systems) has been addressed, for example, using camera-blinding light sources, for example, in the infrared or near infrared region. Such systems only work if the light sources are in the camera's field of view and therefore special hardware must be placed in close proximity to every object to be visually protected. Such systems are relatively costly when there are many objects to protect, for example, multiple pictures in a museum, or impractical for moving objects or in situations where a premeditated location of camera-blinding lights would be difficult, for example, in a factory.

SUMMARY OF THE INVENTION

The present invention provides a unilateral visual privacy system that can be implemented to protect an arbitrary number of items in a given area at low cost by making use of LED lights that may also provide for area illumination. The LED lights are modulated within a frequency range designed to interact with the rolling shutter electronics of common electronic cameras to "print" obscuring bands or colors over the image. The system can cooperate with authorized cameras allowing them to work freely in the protected area and, in cases where there is substantial ambient light that cannot be controlled, can switch to a "watermarking" mode which embeds a "barcode" in the image that can be detected automatically if the image is posted or published.

Specifically, in one embodiment, the invention provides a visual privacy system providing a privacy-enforced environment having a floor area of at least 100 square feet containing a plurality of LED light fixtures synchronously modulatable to provide at least 50 percent of the ambient illumination of the environment and its contents. A modulator communicates with the light fixtures to synchronously modulate the light of the light fixtures between on and off values at a frequency above the flicker fusion rate to impose a banding in images taken by rolling frame shutter cameras relying on the ambient illumination for image acquisition, the banding completely obscuring portions of the image.

It is thus a feature of at least one embodiment of the invention to provide a "unilateral" privacy enforcement mechanism that does not require coordination with the unauthorized camera and that can operate to protect an entire region.

The modulator may synchronously modulate the light of the light fixtures between on and off values at a frequency in excess of 400 Hz.

It is thus a feature of at least one embodiment of the invention to provide a simple modulation system (binary) that can be readily implemented with existing LED hardware used for ambient lighting without degrading the ambient light experience through perceivable flicker.

The modulator may alternatively or in addition synchronously modulate the light of the light fixtures between on and off values at a frequency of less than 2,000 Hz.

It is thus a feature of at least one embodiment of the invention to provide thick obscuring, bands in an acquired image that prevent ready visual interpolation and thus which substantially obscure the image.

In addition, the modulator may synchronously modulate the light of the light fixtures between on and off values with a duty cycle greater than 40 percent.

It is thus a feature of at least one embodiment of the invention to provide a balance between producing ambient illumination and wide obscuring bars in the image.

The ambient illumination may provide an illumination within the environment of no less than 2000 Lux.

It is thus a feature of at least one embodiment of the invention to provide substantial ambient illumination and to maximize the ability of the invention to block picture taking in the environment between the limits of under and over exposure.

The modulation may vary modulation among different frequencies in a nonrepeating pattern over an interval less than 1 second so that time adjacent different frequencies are not related by an integer multiple.

It is thus a feature of at least one embodiment of the invention to prevent simple defeat of the privacy system of the present invention through adjustment of the exposure of the unauthorized camera. While a given exposure setting may defeat the ability to obscure the image at some modulation frequencies, shifting modulation frequencies makes this exposure adjustment strategy impractical.

The LED light fixtures may provide separate red, green, and blue light sources that are independently modulatable, and the modulator provides different modulation frequencies to the red, green, and blue light sources.

It is thus a feature of at least one embodiment of the invention to separately modulate different color channels to greatly increase the difficulty of defeating the privacy system.

The visual privacy system may include at least one authorized camera positioned to view contents of the environment, the authorized camera intercommunicating with the modulator to exchange a timing signal controlling timing of an image acquisition. The timing signal may synchronize the modulation of the light fixtures and the image acquisition by the authorized camera to eliminate banding in images acquired by the authorized camera. For example, when the authorized camera provides a rolling shutter in which rows of an image are sequentially exposed, the timing signal may allow the authorized camera to coordinate an exposure of each row with a time period to produce an exposure spanning a constant cumulative on-time of the plurality of light fixtures.

It is thus a feature of at least one embodiment of the invention to prevent interference with authorized cameras, for example, security cameras in the environment.

The timing signal may indicate at least one of a frequency and a period of repetition of a modulation pattern or at least one of a beginning of a period of repetition and a phase of a modulation pattern.

It is thus a feature of at least one embodiment of the invention to provide a relatively simple communication between the modulator and the authorized camera (e.g., frequency) requiring only low bandwidth or to permit phase locking of the modulator and authorized camera, for example, when transmitting obscuring data during the interframe blanking period of the camera.

The modulator may further provide a barcoding modulation pattern when an illumination in the environment is below a predetermined percentage, the barcoding modulation pattern imposing a non-obscuring banding in images taken by rolling frame shutter cameras relying on the ambient illumination for image acquisition and encoding a predetermined data pattern.

It is thus a feature of at least one embodiment of the invention to provide "bilateral" type privacy protection when "unilateral" type protection is not available because of adverse environmental conditions.

The predetermined data pattern may be a ratio between a first and second frequency of the barcoding modulation pattern.

It is thus a feature of at least one embodiment of the invention to provide an encoding in an image taken by an unauthorized camera that does not require synchronization with that camera.

These particular objects and advantages may apply to only some embodiments falling within the claims and thus do not define the scope of the invention.

DETAILED DESCRIPTION OF THE PREFERRED EMBODIMENT

Figure 1:
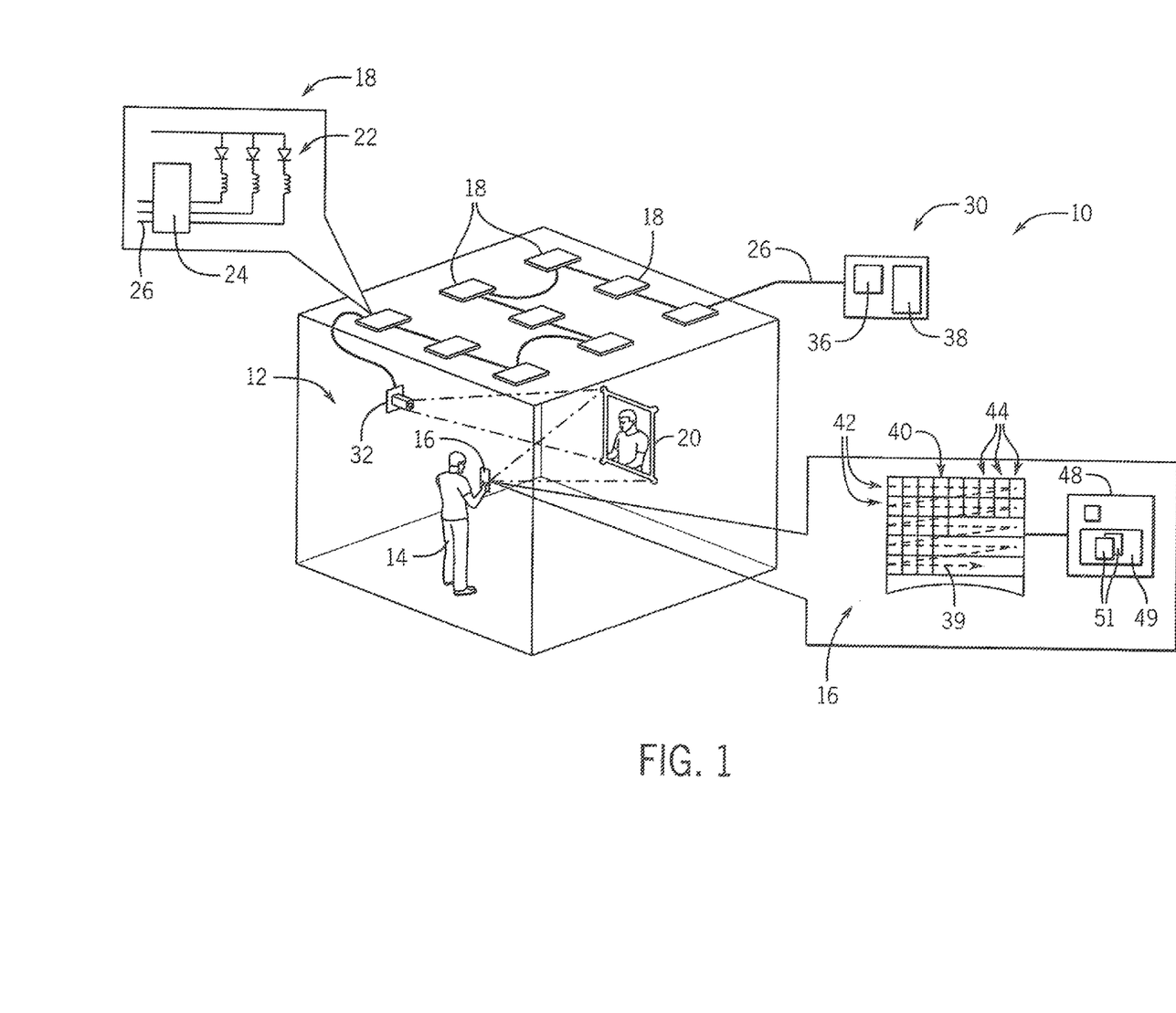
FIG. 1 is a simplified perspective view of a room holding an object for which visual privacy is desired and holding an authorized and unauthorized camera, the room having LED lights communicating with a modulation system to block the use of an unauthorized camera but allowing an authorized camera to provide imaging.

Referring now to FIG. 1, a privacy system 10 of the present invention may establish visual privacy in a room 12 or other illuminated area where individuals 14 carrying unauthorized cameras 16 may be present. The unauthorized camera 16 may be a rolling shutter camera employing a CMOS detection element, for example, having a shutter speed of 1/24 of a second or faster and typically on the order of 1/30 of the second. Such an unauthorized camera 16 may be found, for example, in a standard cellular phone or tablet, and may be expected to be provided in other wearable or easily carried camera systems.

Typically, the room will have an area of greater than 100 square feet and ceiling heights ranging from 8 to 20 feet although no size limitation is contemplated by the present invention so long as an adequate ambient illumination level may be obtained. In this regard, the room will generally be illuminated by a set of light fixtures 18 to provide a lighting level equal to or greater than that of a standard office (700 Lux) and preferably at a higher level in excess of 2000 Lux to provide the invention with greater efficacy.

The room 12 may contain contents 20 including both objects or people for which visual privacy is desired, for example, a painting in a museum where no photograph should be taken, although it is contemplated that the invention may be used in any environment where ambient lighting may be controlled.

Each of the light fixtures 18 may provide a monochrome (white) LED array or preferably a three-color LED array 22 providing red, green, and blue LEDs that may be independently modulated by a control circuit 24 according to a received signal-over-signal channel 26 as will be discussed below. The control circuit 24 may provide for controlled current to the LEDs according to techniques well known in the art, for example, for color balancing, as well as to allow the LEDs to be turned to either an on or off state according to the signal channel 26. In this regard, the control circuit 24 may make use of standard commercial technology providing LED control coupled with circuitry for receiving modulation patterns over signal channel 26. The invention also contemplates operation in a monochrome mode using LEDs producing white light, for example, with a phosphor and ultraviolet source, as mentioned above.

A synchronizing modulator 30 may provide a modulation signal over signal channel 26 to each of the light fixtures 18, for example, through a daisy-chained conductor system, carrier current communicating over the light fixture power supply lines, wireless signaling (including radiofrequency and light frequency communication), or the like. The signal-over-signal channel 26 may simply provide on and off state which the light fixtures 18 follow or may indicate at a higher level a timing and pattern providing instructions allowing the modulation patterns to be developed in a distributed fashion among each of the light fixtures 18. Generally, each of the light fixtures 18 will be synchronized to provide their respective on and off states at the same time.

The synchronizing modulator 30 may also communicate with one or more authorized cameras 32 positioned in the room 12 and intended to provide for imaging of objects including contents 20 in the room 12 without interference. Such authorized cameras 32, for example, may be security cameras where unobscured imaging is essential. In this regard, the modulator 30 may provide a signal-over-signal channel 26 coordinating acquisition by the authorized camera 32 and providing either the on and off pattern directly or frequency and phase information necessary for the authorized camera 32 to coordinate acquisition of visual information without interference. In some embodiments, the signal-over-signal channel 26 may be identical to that provided over channel 26 to the light fixtures 18. This signal on channel 26 may be encrypted or otherwise protected against unauthorized interception.

The central modulator 30 may, for example, provide for a processor 36 executing a stored program 38 as will be discussed below. Each of the unauthorized camera 16 and authorized camera 32 may provide for a similar computer processing system.

Referring still to FIG. 1, generally an unauthorized camera 16 held by an individual 14 will provide for a CMOS array 40 having light sensors each sensing one pixel of an image. These light sensors will be arranged in rows 42 and rectilinear columns 44 and are usually scanned in a row by row basis (termed a rolling shutter) shown by dotted line 39 in which a first row is exposed and then read out by an associated camera processor 48, followed by exposure and read out of the next row and so on. Sequential rows may have periods of overlapping exposure but generally the exposure times of successive rows are increasingly delayed.

The camera processor 48 will include a memory 49 holding image files 51 collected from the CMOS array 40 and may communicate with the display and user controls or the like (not shown) depending on the camera application.

Figure 2:
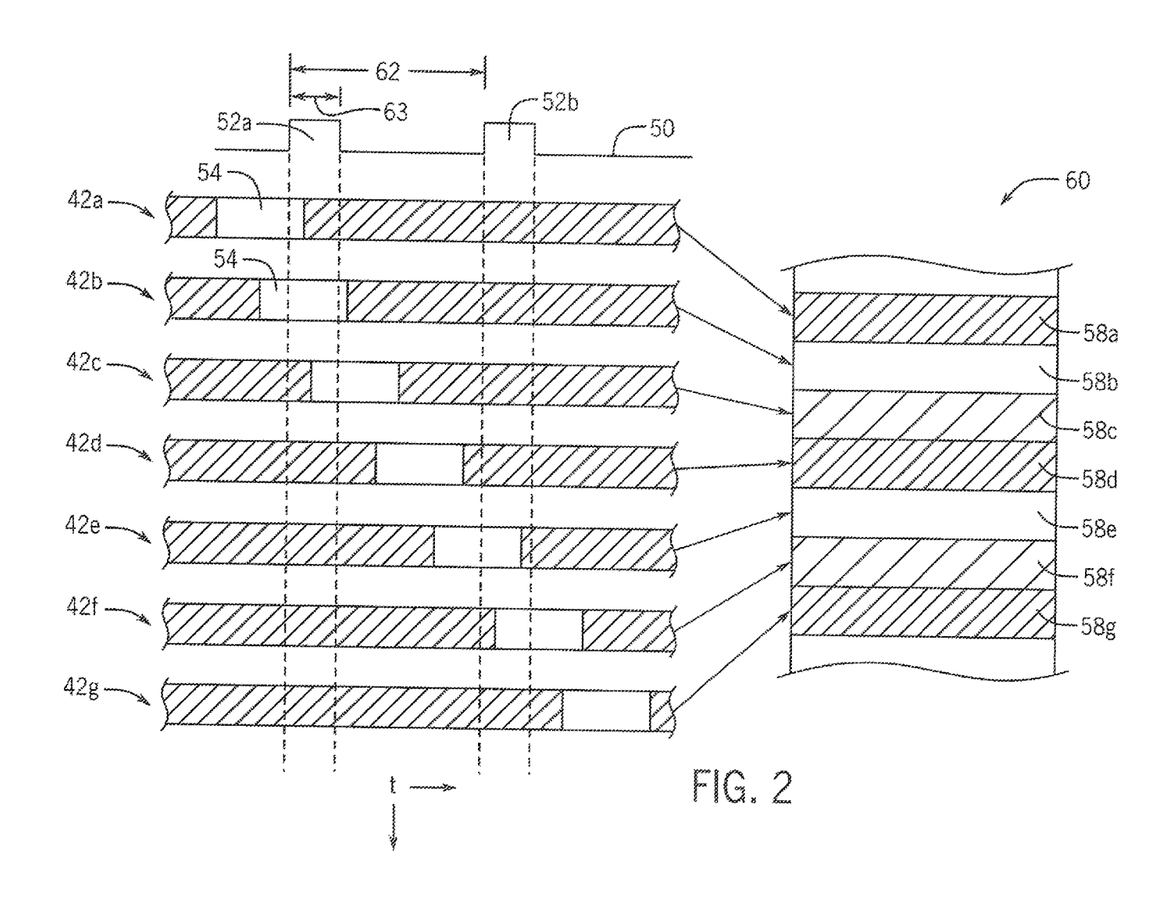
FIG. 2 is a timing diagram showing a modulation of the lighting system of FIG. 1 with respect to exposure periods for a rolling shutter of the unauthorized camera of FIG. 1 such as provides a banding in the acquired image.

Referring now to FIGS. 1 and 2, in a simple example, each of the light fixtures 18 will be illuminated periodically as indicated by the waveform 50 at a periodicity 62 during illumination periods 52 of duration 63. These durations 63 of illumination periods 52 are adjusted so that the illumination periods 52 will fall into the exposure windows 54 of some CMOS rows 42 and not others. Thus, for example, an exposure window 54 of a first row 42*a* may occur before an illumination period 52*a* thus providing for a low exposure for the light sensors of that row 42 and a corresponding dark row 58*a* in the resulting image 60.

In contrast, a next row 42*b* may have an exposure window 54 fully aligned with the illumination period 52*a* producing a bright row 58*b* in the resulting image 60 caused by a full exposure of the light sensors of that row 42*b*. A next row 42*c* may provide an exposure window 54 partially aligned with illumination period 52*a* thereby providing a somewhat darker row 58*c*.

Generally, each of the exposure windows 54 of succeeding rows 42 will be staggered in time (either at disjoint times or overlapping times) so as to continue in this pattern to produce a set of dark and light rows 58 in the image 60. The speed of the scanning through the rows 42 will be such that the exposure of the camera will be essentially constant in this time meaning that the rows 58 will include over and underexposed regions blocking or significantly reducing information in the image 60. The exposure separation in the over and underexposed regions, such as controls the obscuring quality of the bands, may be accentuated through the use of high-intensity LEDs in the light fixtures 18. High-intensity LEDs tend to produce overexposure in rows 42 having alignment of the illumination periods 52 and exposure windows 54 by increasing the average exposure of all rows 42, and tend to create severe underexposure when the illumination periods 52 are unaligned with a given exposure window 54.

Figure 3:
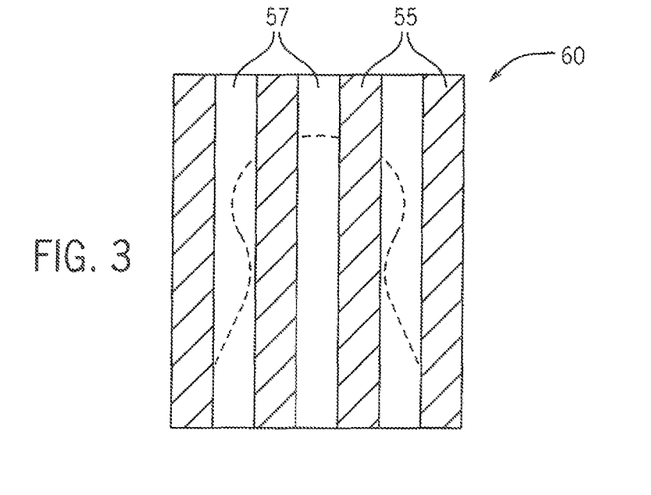
FIG. 3 is a simplified representation of an image obtained from the camera of FIG. 1 as blocked by the lighting system.

Referring, now to FIGS. 2 and 3, generally when the camera exposure window 54 is equal to or shorter than the dark time between illumination periods 52 (periodicity 62 minus duration 63) there will be completely dark bands 55. Likewise, depending on the strength of the light during illumination periods 52 (its peak value and the length of illumination periods 52) and the sensitivity of the unauthorized camera 16, the space in the image between the dark bands 55 may also be overexposed providing a set of bright bands 57 also obscuring data. The invention contemplates that for a given exposure setting of the unauthorized camera 16, there will be either completely dark bands 55 with intelligible image showing between the dark bands 55 or completely overexposed bands 57 with the dark bands 55 revealing some intelligible image, although there can be situations where the image is completely obscured by both bands 55 and 57. The bands 55 and 57 are shown vertically reflecting the fact that the rows of the CMOS sensor, and hence the scanning direction, can be oriented arbitrarily.

The bands 55 and 57 in the image not only redact image information in the same way that black lines (or erasures) would work in text, but the banding may also upset the camera's autofocus function because of the variations in exposure which upset the focusing algorithm and/or because the sharpness of the bands does not depend on the lens focus (being a time domain phenomenon) suggesting to the autofocus circuit that the camera is in focus even when the image scene is blurred.

In order to maximize the obscuring effect of the dark bands 55 and 57, the periodicity 62 of the illumination periods 52 should be much shorter than the response time of a camera auto exposure circuit but long enough to provide a limited number of bands 55 or 57 of substantial width within the image 60. Larger bands 55 and 57 prevent the missing image information from being visually interpolated when some information is visible in the dark bands 55 or light bands 57. Desirably the modulation frequency of the light fixtures 18 (the inverse of the periodicity 62) will be low enough to produce a limited number of bands 55 and 57 within a single scan of the CMOS array 40 but also high enough, to be above the flicker fusion rate typically being at a frequency above 100 Hz. When the duty cycle of the illumination period 52 is approximately 50 percent, three to ten bands may be desired in an image.

Lower duty cycles of the illumination periods 52 (duration 63 divided by periodicity 62) provide increased degradation of the image 60 by generating fully black bands but reduce the ability of the system to provide for overexposure bands 57 during the on time of the illumination periods 52 which can also obscure the image. In one embodiment, the invention may adopt a relatively modest duty cycle (between 0.4 and 0.6) and high peak intensity of the light during illumination period 52, for example, greater than typical office illumination of 700 Lux and desirably above 2000 Lux.

Desirably the frequency provided by the modulation of the illumination at periodicity 62 will be such as to produce multiple bands within a single scan of the CMOS array 40 as well as to be above the flicker fusion rate typically being at a frequency above 100 Hz. This lower frequency bound prevents modulation of the light fixtures 18 (which also provide ambient illumination) from being visible or distracting to a human observer. The flicker fusion rate is a rate of flicker for a given brightness above which a human observer no longer perceives a flashing. For most people, frequencies above 400 Hz are free from flicker and thus are above the flicker fusion rate. Lower frequencies may be accommodated under particular illumination conditions that may be empirically determined.

Referring again to FIG. 2, it will be appreciated that when exposure window 54 is long enough to equal an integer multiple of the periodicity 62 of the illumination periods 52, the camera will effectively integrate or average the waveform 50 and in this way, eliminate the bands 55 and 57 preventing the system from obscuring the image 60. For this reason, it is possible that a user could adjust the unauthorized camera 16 to eliminate banding problem, for example, by adjusting the exposure time of that unauthorized camera 16 to match an integer multiple of the periodicity 62, for example, by observing banding in the image and adjusting the exposure setting accordingly.

Figure 4:
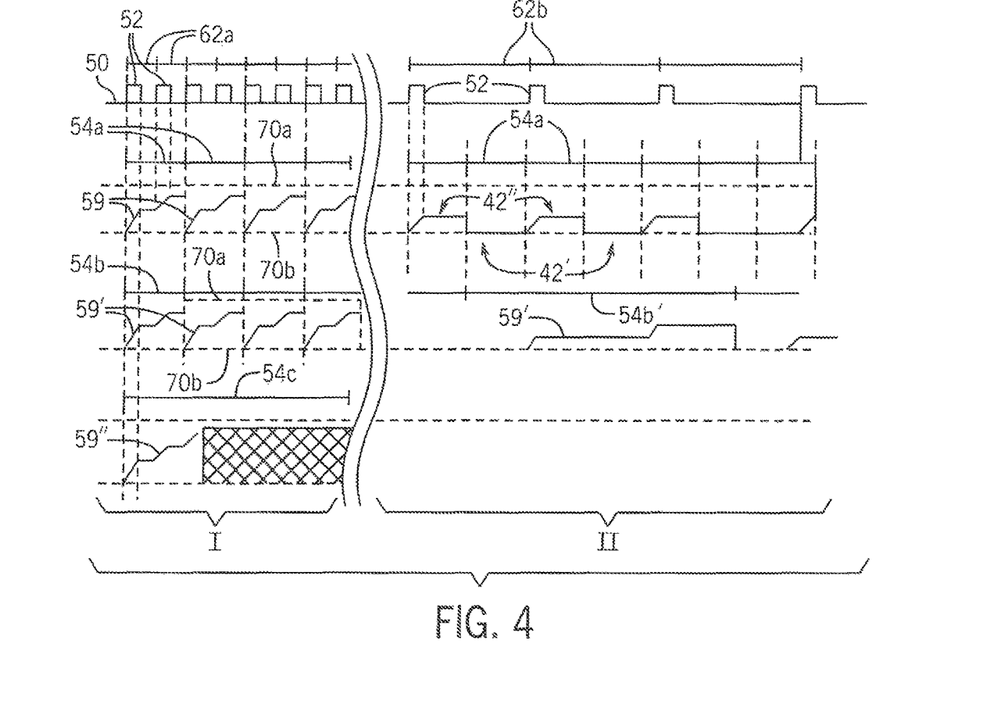
FIG. 4 is a timing diagram similar to that of FIG. 2 showing a multifrequency modulation pattern together with a coordination of image acquisition by an authorized camera to allow standard imaging.

Referring now to FIG. 4, in order to prevent this circumvention of the present privacy system through simple exposure rate control in the unauthorized camera 16, the invention contemplates varying the time periodicity 62 between illumination periods 52 to increase the difficulty to the user of an unauthorized camera 16 in selecting a static exposure rate that will defeat the present invention. In this regard, the modulator 30 may switch between two (or more) different periods, for example, periodicity 62 and longer periodicity 62', essentially changing the frequency at which the LEDs of the light fixtures 18 are illuminated. Ideally these different frequencies are not integer multiples of each other, avoiding the possibility that an exposure time adjusted to be equal to one time periodicity 62 would likewise defeat the second time periodicity 62'.

Preferably, switching between the different periodicities 62 and 62' occurs at a rate selected to prevent the formation of strong low-frequency side bands that might be below the flicker fusion rate mentioned above. In one embodiment, for example, the modulation rate may be approximately 200 Hz meaning that a new periodicity 62 is selected every 0.005 seconds. The central modulator 30 may communicate the new frequencies to each of the light fixtures 18 or may communicate a schedule to the individual light fixtures 18 that may then be used to generate the frequency pattern on a distributed basis.

Referring still to FIG. 4, the operation of this frequency switching can be understood by considering, for example, an unauthorized camera 16 having an exposure window 54a at a first time during modulation periodicities 62a where the exposure window 54a coincidentally equals an integer multiple of the modulation periodicity 62a. In a first time interval (I) during exposure window 54a, the unauthorized camera 16 may receive and integrate light from two illumination periods 52 indicated by cumulative exposure 59 which climbs a fixed amount for each illumination period 52 for each imaging row 42, ultimately providing, in this example, an exposure that is neither underexposed (as indicated by level 70a) or over exposed (as indicated by level 70b) during scanning of a single row 42 in the image (shown in FIG. 1). By coincidence, this could be an acceptable exposure level on the unauthorized camera 16 to effectively decode the obscured image. This small exposure window 54a, however, when applied to a later modulation periodicity 62b at time interval (II) may receive light from no illumination periods 5 for rows 42' providing no exposure of the resulting image row 42' (at level 70a) or underexposure at intervening rows 42". The result is the banding described with respect to FIG. 3 with black bands 55 and a general underexposure of the image 60.

Referring still to FIG. 4, conversely, it will be understood that if the unauthorized camera 16 coincidentally selects an exposure window 54c equal to the latter modulation periodicity 62b, then during time interval (I) the exposure window 54c will capture so many illumination periods 52 so as to drive the cumulative exposure 59 into overexposure level 70b as it integrates an additional illumination period 52.

Additional robustness to the above-described banding system may be obtained by applying different and independent periodicities 62 to each different color channel of red, green, and blue of the image 60. This approach provides a set of obscuring bands of different colors and may further affect the image by interfering with the color balance system of the unauthorized camera 16.

Referring now to FIGS. 1 and 4, the present invention permits an authorized camera 32, for example, shown mounted in the room 12 but conceivably held by another individual, to take images without interference by the system 10 of the present invention. This may be done most simply when there is a constant periodicity 62 (in the case of FIG. 2) by ensuring that the exposure window 54 of the authorized camera 32 exactly equals an integer multiple of the periodicity 62. This information may be communicated from the modulator 30 to the authorized camera 32 either in the form of exposure time value, or start and stop signals having a separation of that time. It will be appreciated that the authorized camera 32 may conversely control the modulator 30 to similar effect.

Referring to FIG. 4, in the case of a varying modulation frequency, the authorized camera 32 may receive a set of different values for periodicity 62a and periodicity 62b as those periodicities change under control of the modulator 30. That is, the authorized camera 32 may receive periodicity period 62a during time period (I) and set its exposure window 54b to equal in length to a predetermined integer multiple of this periodicity 62a and may receive periodicity period 62b during time period (II) setting its exposure window 54'b equal to the same integer multiple of this periodicity period 62b. In both time intervals (I) and (II), the cumulative exposures 59' will be identical. Note that the authorized camera 32 need not align its exposure window 54b with the periodicity 62a and 62b (that is, phase alignment is not required) but rather only frequency matching is necessary.

In this way, the authorized camera 32 may provide for consistently exposed CMOS rows 42 despite the widely varying illumination frequencies. Again, it will be appreciated that this information can be communicated to the authorized camera 32 by a variety of means including a wire or wireless, signal from the modulator 30 or maybe derived by observing the light fixtures 18, for example, to count illumination periods 52 to provide consistent exposure for each CMOS row 42.

Figure 5:
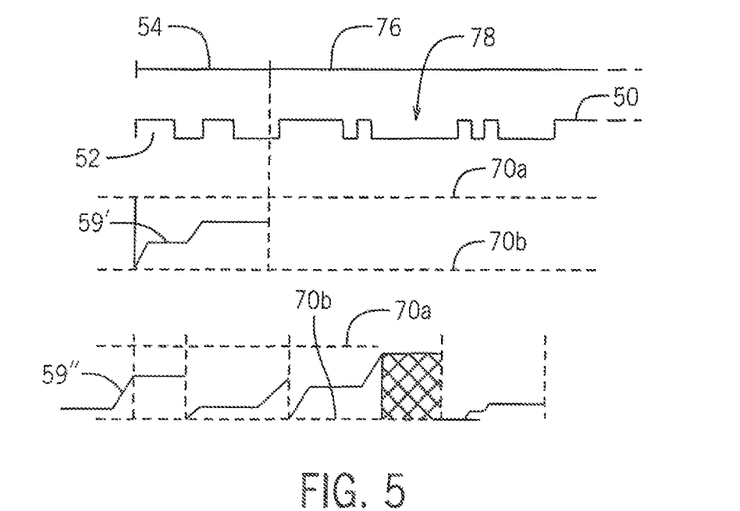
FIG. 5 is a timing diagram similar to that of FIG. 4 showing use of a frame separator time for additional obscuring techniques.

Referring now to FIG. 5, after the exposure windows 54 have been completed for each row of the image 60 there may be a blanking interval 76 separating a second scan of each of the rows of the image 60. This blanking interval 76 is a normal part of camera operation and is a time during which there are no exposures of any of the rows 42 and may be used by the camera for processing or data transfer. In one embodiment, the present invention contemplates that during this blanking interval 76, the light fixtures 18 may be activated to provide a random or pseudorandom pulse sequence 78 (or any arbitrary pulse sequence) matching the duty cycle occurring during regular exposure of the sensor. The cumulative exposure 59' of the authorized camera 32 will not be affected by this pulse sequence which occurs during its blanking interval 76, but an unauthorized camera 16 out of phase with the authorized camera 32 will capture these pulses 78 driving its cumulative exposure 59" into overexposure indicated by the crosshatched portion of the graph of cumulative exposure 59". Coordination of the blanking interval 76 with the operation of the light fixtures 18 may be done by communication from the authorized camera 32 to the central modulator 30 or vice versa with either device acting as a master.

The invention is ideally suited for a closed environment where 40 percent or more and typically 50 percent or more, or desirably 80 percent or more, of the light in the room 12 is provided by the light fixtures 18. In this way, high contrast between the on and off times of the light fixtures 18 is ensured. Nevertheless, the invention also contemplates use in environments that may not consistently provide this level of illumination control, for example, because of sunlight coming through windows or auxiliary light sources or the like. In such cases, the modulator 30 may move from an image blocking mode, in which the images acquired by the unauthorized camera 16 are blocked through dark or overexposed bands 55 and 57 as described above, to a barcode mode where the mechanism of producing the dark and overexposed bands 55 and 57 is used to produce low contrast and possibly non-obscuring bands in the image collected by the unauthorized camera 16, in this latter mode, the bands 55 and 57 form a "barcode" that can be used later, after the images are displayed, to identify pictures taken in restricted areas either for policing or through automatic systems that refuse to display or transmit such pictures.

Figure 8:
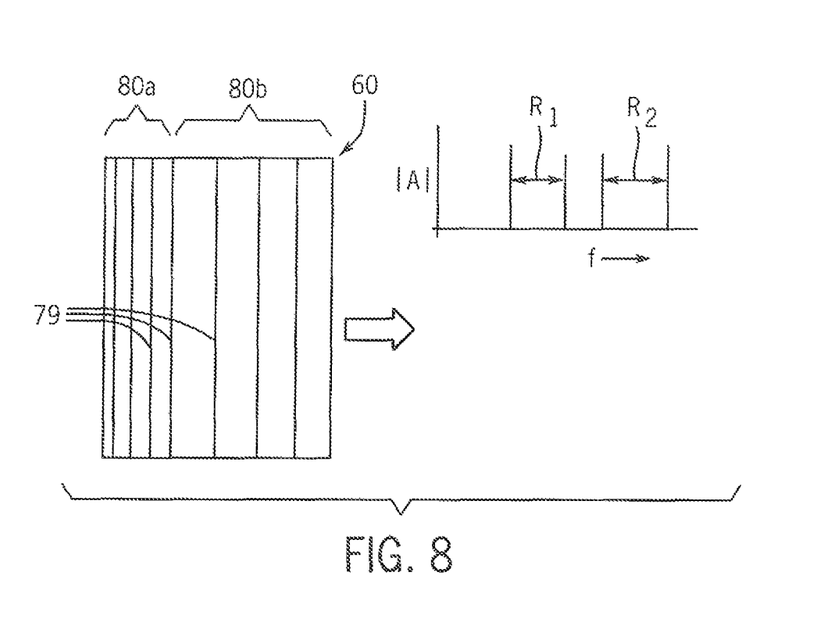
FIG. 8 is a representation of an imprinting of barcodes on unauthorized images for later identification.

Referring to FIG. 8, this barcoding may be accomplished in one embodiment through a set of relatively low contrast bars 79 providing two regions 80a and 80b distributed across the image 60 and corresponding to different times during the acquisition of that image 60. The bars 79 in the region 80a may have a first frequency that is in a first fixed frequency ratio to the frequency of the bars in region 80b. This first fixed frequency ratio R may uniquely encode the fact that indicates that the image 60 was taken in a restricted area.

The bars 79 may be either slightly overexposed or under exposed and may be sensitively recovered from any image 60, even in low contrast, through the use of a Fourier transform that averages all columns of data (rows in the depicted image of FIG. 8) and analyzes frequency content to isolate particular frequencies. In this regard, the bars 79 may be created through extremely short duty cycles of illumination periods 52 of the light fixtures 18 such as enforces a high-frequency content on the image 60 that may exceed the optical bandwidth of the camera thus being readily distinguishable from the image 60 itself.

It will be appreciated that multiple different frequency pairs may be used for regions 80a and 80b encoding the same or a set of frequency ratios $R_i$ to provide either greater noise immunity or to encode a series of values, for example, expressing text messages or the like. It will further be understood that the regions 80a and 80b may be distributed in any fashion in the image 60 and thus there is no need to coordinate this encoding with the acquisition timing of the unauthorized camera 16. It will further be appreciated that because a ratio is being considered, this information is not lost when the unauthorized camera 16 employs a range of different exposure times which may affect the physical band size and spacing in the image 60 but not the frequency ratio.

Additional robustness can be obtained by encoding the same or independent frequencies in each of the different color channels of red, green, and blue of the image by separate modulation of the LEDs of the light fixtures 18. Each of these different channels may be individually decoded to determine the necessary values of R or multiple values of R.

Using the barcoding system, the present invention may switch from a unilateral to a bilateral mode of operation that works even when the external light source greatly exceeds the power of the light fixtures 18. Such a system could conceivably be used in daylight with a directed beam of light from a fixture 18 on the object to be barcoded for protective purposes.

Referring now to FIG. 5, the system 10 of FIG. 1 may operate through a program executed on the modulator 30 to first check the ambient light as indicated by decision block 90. This check may be done through a separate light detector or may make use of a signal from the authorized camera 32 to determine whether the ambient light is primarily provided by the fixtures 18 or whether there is additional unmodulated light from an external source that would corrupt the process of providing privacy protection. In this regard, the sensor or authorized camera 32 may measure light in the room at the time the light fixtures 18 are turned off. If there is an interfering light source illuminating the room beyond a predetermined value, the latter of which may be determined for each environment, such as would prevent obscuring of images taken by unauthorized camera 16 in the room 12, the system 10 may move to a barcoding mode.

In the barcoding mode and at process block 92, the barcoding frequencies and phase or the like may be provided to the authorized camera 32 so that the authorized camera 32 may coordinate acquisitions to eliminate any obscuring barcode in the images acquired. This coordination adjusts the exposure window 54 of the authorized camera 32 in a manner described above with respect to obscuring bands 55 and 57. In some embodiments, the barcoding may be faint enough so that this step need not be performed.

After any updating of the authorized camera 32, the central modulator 30 may modulate the light of the fixtures 18 to multiple frequencies as indicated by process block 94 and 96 producing the barcoding bands of regions 80a and 80b shown in FIG. 8 and described above. These frequency pairs may then be cycled with new frequency pairs having the same or different ratios as indicated by process block 98 and this process repeated indefinitely (so long as the interfering external light signal detected at decision block 90 is present) to provide for continuous barcoding. The resulting low contrast bars 79 in the barcoding mode may allow greater than four bits of image information to be communicated through the bar 79.

If at decision block 90, the ambient light is primarily provided by the fixtures 18 (for example, in excess of 50 percent) then, again, authorized camera 32 may be updated with modulation information that will be used for blocking normal photography, as indicated by process block 100, so that the authorized camera 32 can avoid having obscuring bands 55 and 57 in its image. Next, the modulation pattern may be imposed on the light fixtures 18 indicated by process block 102 as discussed above with respect to FIGS. 2 and 4. At least one of the obscuring bands 55 and 57 may prevent more than four bits of image information from being viewed through the bar over an area of at least 20 percent of the image 60.

Figure 6:
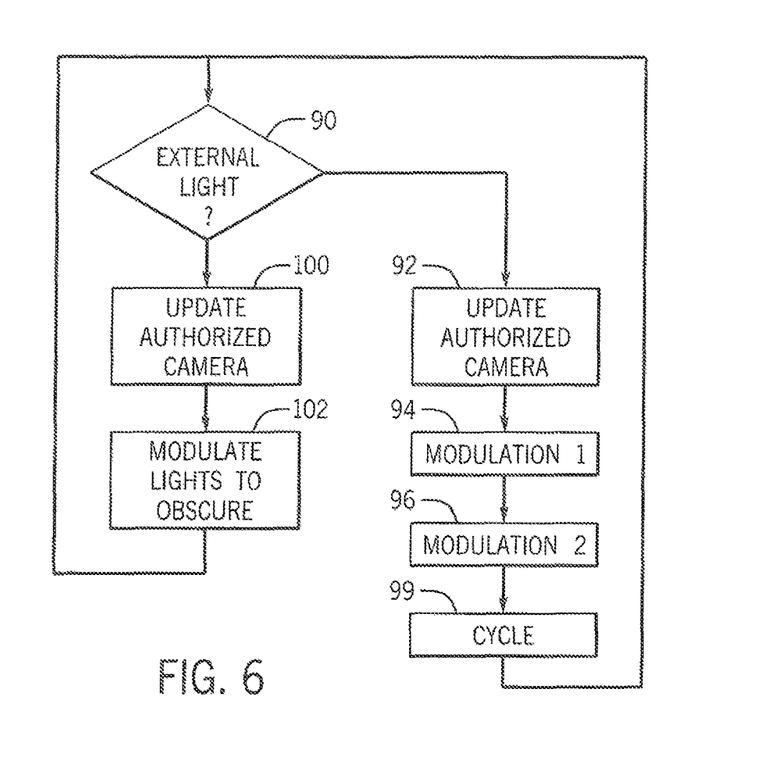
FIG. 6 is a flowchart of the modulation system of FIG. 1 such as may respond to external ambient light sources to convert from an obscuring mode to a barcode mode.
Figure 7:
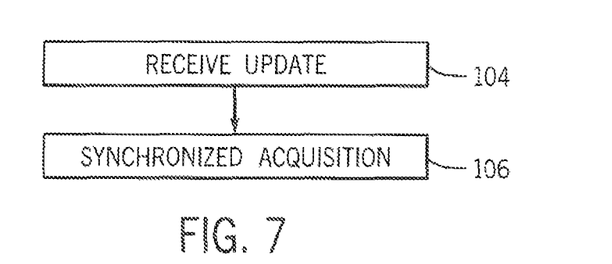
FIG. 7 is a program executed by the authorized camera for providing unobscured images.

Referring to FIG. 6, the authorized camera 32 receiving the update information at either process block 92 or 100, as indicated by process block 104, may then synchronize its acquisition of image data as discussed with respect to FIG. 4 as indicated by process block 106.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising" "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A visual privacy system comprising:
a privacy-enforced environment having a floor area of at least 100 square feet;
a plurality of LED light fixtures synchronously modulatable to provide at least 50 percent of an ambient illumination of the environment and its contents;
a modulator communicating with the light fixtures to synchronously modulate the light of the light fixtures between on and off values at a frequency above the flicker fusion rate to impose a banding in images taken by rolling frame shutter cameras relying on the ambient illumination for image acquisition, the banding completely obscuring portions of the image; and
wherein the modulator further provides a barcoding modulation pattern when an illumination in the environment by the LED light fixtures is below a predetermined percentage of the illumination in the environment, the barcoding modulation pattern imposing a non-obscuring banding in images taken by rolling frame shutter cameras relying on the ambient illumination for image acquisition and encoding a predetermined data pattern.

2. The visual privacy system of claim 1 wherein the modulator synchronously modulates the light of the light fixtures between on and off values at a frequency in excess of 400 Hz.

3. The visual privacy system of claim 2 wherein the modulator synchronously modulates the light of the light fixtures between on and off values at a frequency less than 2,000 Hz.

4. The visual privacy system of claim 3 wherein the modulator synchronously modulates the light of the light fixtures between on and off values with a duty cycle greater than 40 percent.

5. The visual privacy system of claim 1 wherein the ambient illumination provides an illumination within the environment of no less than 2000 Lux.

6. The visual privacy system of claim 1, wherein the LED light fixtures provide separate red, green, and blue light sources that are independently modulatable and wherein the modulator provides different modulation frequencies to the red, green, and blue light sources.

7. A visual privacy system comprising:
a privacy-enforced environment having a floor area of at least 100 square feet;
a plurality of LED light fixtures synchronously modulatable to provide at least 50 percent of an ambient illumination of the environment and its contents;
a modulator communicating with the light fixtures to synchronously modulate the light of the light fixtures between on and off values at a frequency above the flicker fusion rate to impose a banding in images taken by rolling frame shutter cameras relying on the ambient illumination for image acquisition, the banding completely obscuring portions of the image; and
wherein the modulation varies among different frequencies in a nonrepeating pattern over an interval less than 1 second and such that time-adjacent different frequencies are not related by an integer multiple.

8. A visual privacy system comprising:
a privacy-enforced environment having a floor area of at least 100 square feet;
a plurality of LED light fixtures synchronously modulatable to provide at least 50 percent of an ambient illumination of the environment and its contents;
a modulator communicating with the light fixtures to synchronously modulate the light of the light fixtures between on and off values at a frequency above the flicker fusion rate to impose a banding in images taken by rolling frame shutter cameras relying on the ambient illumination for image acquisition, the banding completely obscuring portions of the image; and further including at least one authorized camera positioned to view contents of the environment, the at least one authorized camera intercommunicating with the modulator to exchange a timing signal controlling timing of an image acquisition; and wherein the timing signal synchronizes the modulation of the light fixtures and the image acquisition by the authorized camera to eliminate banding in images acquired by the at least one authorized camera.

9. The visual privacy system of claim 8 wherein the at least one authorized camera provides a rolling shutter in which rows of an image acquired by the at least one authorized camera are sequentially exposed and wherein the timing signal allows the at least one authorized camera to coordinate an exposure of each row with a time period to produce an exposure spanning a constant cumulative on-time of the plurality of light fixtures.

10. The visual privacy system of claim 9 wherein the timing signal indicates at least one of a frequency and a period of repetition of a modulation pattern and/or at least one of a beginning of a period of repetition and a phase of a modulation pattern.

* * * * *